(No Model.)
W. S. CAMPBELL.
SELF SETTING ANIMAL TRAP.
No. 246,369. Patented Aug. 30, 1881.
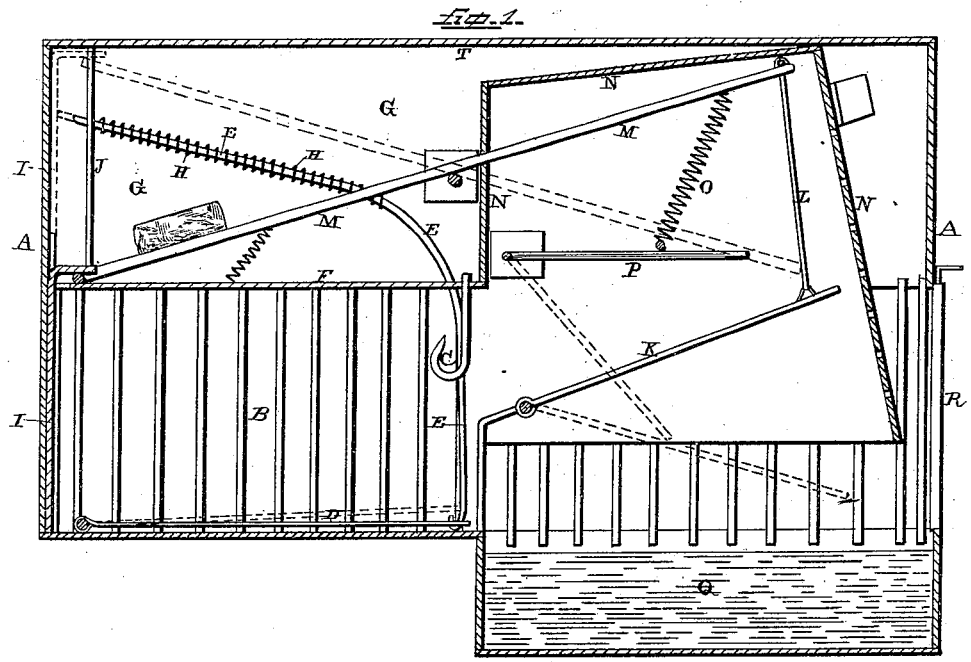
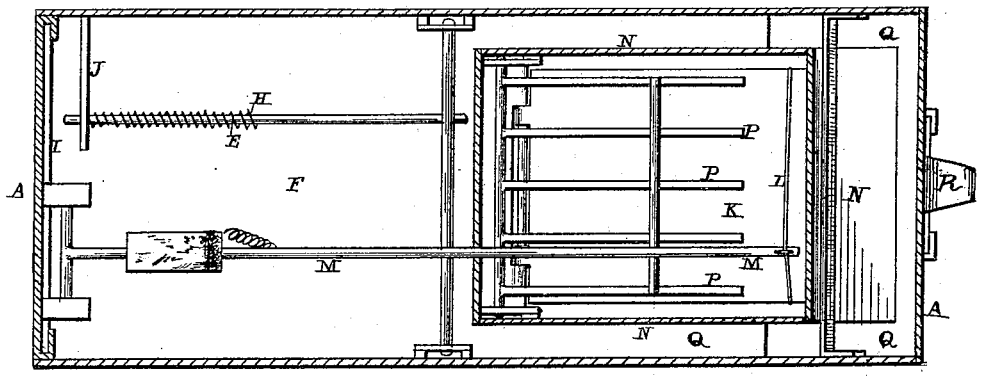

UNITED STATES PATENT OFFICE.

WILLIAM S. CAMPBELL, OF COLUMBUS, NEBRASKA.

SELF-SETTING ANIMAL-TRAP.

SPECIFICATION forming part of Letters Patent No. 246,369, dated August 30, 1881.

Application filed January 6, 1881. (No model.)

*To all whom it may concern:*

Be it known that I, WILLIAM S. CAMPBELL, a citizen of the United States, residing at Columbus, in the county of Platte and State of Nebraska, have invented certain new and useful Improvements in Self-Setting Animal-Traps; and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

My invention relates to an improvement in animal-traps for catching rodents, wolves, and animals of all kinds which are destructive to flocks and crops; and it consists in the combination of a pivoted lever, the front end of which is made to raise the door, and which is connected at its rear end to a platform, upon which the animal steps in attempting to escape from the first chamber of the trap, and to a pivoted door by means of a spiral spring, which door is placed above the said platform and serves to prevent the animal from returning to the front end or chamber of the trap after it has once passed under the door, all of which will be more fully described hereinafter.

The object of my invention is to provide a self-setting trap which can be made large enough to catch large animals of prey or small enough to catch rodents and other such small animals as are destructive to crops, and which trap, instead of simply keeping the animal alive to be killed in the trap before it can be taken out, drowns it as soon as it is dropped from the rear platform.

Figure 1 is a vertical longitudinal section of my invention. Fig. 2 is a horizontal section of the same.

A represents the frame of my trap, which may be either of the construction here shown or any other which may be preferred. In the front end of this frame is formed a chamber, B, into which the animal enters for the purpose of getting at the bait which is placed upon the hook C. The sides of this chamber are formed by vertical rods or bars, which are placed at any desired distance apart, so as to allow the animal to see through from side to side, and thus encourage it to enter the chamber for the purpose of getting at the bait. Upon the bottom of this chamber is placed the pivoted platform D, which has connected to it the curved rod E, which extends up through the top F of the chamber, and through the chamber G, which is placed just over the chamber into which the animal enters, and which rod has connected to it a spiral spring, H, for the purpose not only of keeping the platform raised at its inner end, but for the purpose of holding the door I in a raised position. One end of the spring H is fastened to the rod E, and the other one is fastened to the guide J, through which the rod passes. As this spring is stretched in being secured in position, it exerts a constant pull upon the rod E, so as to force the front end of the rod against the raised door I, as shown in Fig. 1. The upper end of this rod passes through a suitable guide or support, J, formed in the upper chamber, and bears against the door with sufficient force to hold it in an elevated position, and thus allow any animal to freely enter through the front end of the chamber B. This door is held in an elevated position until the animal has entered the chamber B, and by its weight upon the pivoted platform has overcome the tension of the spring and drawn the rod backward so as to release the door. The door falls as soon as it is released by the curved rod, and thus closes the front end of the chamber, so that the animal cannot make its escape. The animal, finding itself entrapped, at once seeks an avenue of escape, and so passes from the chamber B up upon the pivoted platform K, which is supported at its rear end by means of a loop, L, which is connected to the rear end of the pivoted lever M. The front end of this lever passes through the small frame N, which is made above the platform K, and has a cross-piece secured to its front end for the purpose of catching under projections formed on the rear side of the door.

Upon the front end of the rod there may be placed a sufficiently heavy weight to keep the rear end of the platform always raised upward; or there may be a suitable spring connected to this rod for the purpose of pulling the front end downward; or there may be both a weight and a spring employed for this purpose. When the rod is left free to act its front end rests upon the bottom of the upper chamber, so as to leave the door perfectly free to fall and close the front end of the chamber B; but when the rear end of the platform K is depressed by the weight of the animal in seeking to escape from the chamber B the front end of this rod is raised upward, and in rising upward it raises the door with it sufficiently high to have the door caught by the frictional spring-rod which is connected to the platform in the bottom of the chamber B.

Also, connected to the rear end of the pivoted lever M, by means of the spiral spring O, is a hinged door, P, which is held supported by the spring, so as to allow the animal to pass freely under it, but which door, as soon as the platform sinks downward, automatically closes by its own weight, so as to prevent the animal from returning to the chamber B after it has once passed under this door. The animal having once passed under the hinged door P, the platform sinks suddenly downward and the animal slips off the platform into the water tank or reservoir Q, which is made in the bottom of the rear end of the frame A. This reservoir or tank will extend considerably below the bottom of the chamber B, and as it is to be sunk into the ground, it may be made sufficiently large and deep to drown any animal which can be caught in the trap. The sides of this chamber may be wholly closed up or formed of iron rods or bars like the sides of the chamber B, as may be preferred, and at any suitable point is made a suitable door, R, through which the animals can be taken from the reservoir.

Above the top of the platform K is made, inside of the frame A, a separate and independent frame N, which serves to prevent the animal from climbing up out of the tank into the upper portion of the trap, and which has made through its rear end a number of holes or perforations, so as to lead the animal, while in the chamber B, to think that it can escape from that end of the trap. The whole upper portion of the trap is covered over by a lid, T, which is provided with hinges, so that it can be raised upward, and a suitable clasp for holding it down. By means of this lid access can be had to the various parts of the trap, so as to repair them in case they should at any time become broken or get out of order.

The operation of my trap is as follows: The door at the front end of the trap is first raised, and then the bait is placed upon the hook in the chamber B. The animal enters through the door to get the bait, and steps upon a platform in the bottom of the chamber and depresses the platform at its rear end, so that the curved spring-rod is drawn back out of connection with the door, and the door, being no longer supported, falls and closes the front end of the chamber. The animal, in seeking to escape, climbs upon the platform K and moves toward the rear end of the trap until it has passed under the pivoted door P, when, the weight of the animal overcoming the weight or the spring, or both, which are attached to the front end of the rod M, the platform suddenly tilts downward and the animal is precipitated into the water-tank below. As there is no escape from this water-tank, which may be of any desired depth, the animal is drowned. As the platforms sinks downward the front end of the lever is raised upward, and this lever, in rising, raises the door with it sufficiently far for the curved frictional spring-rod to catch hold of it, and in this manner the trap is again set for the next animal that comes along.

Having thus described my invention, I claim—

1. In a self-setting animal-trap, the combination of the door I, the pivoted rod M, connected to it at its front end, the platform K, rod L, hinged door P, and spring O with the tank Q, substantially as shown.

2. The combination of the platform D, rod E, spring H, guide J, and door I with the rod M, rod L, platform K, door P, and water-tank Q, the parts being combined and arranged to operate substantially as set forth.

In testimony whereof I affix my signature in presence of two witnesses.

WILLIAM S. CAMPBELL.

Witnesses:
C. A. NEWMAN,
C. C. CARRIG.